Nov. 25, 1941.                G. FAULDS                2,263,724
                             ANTISKID TIRE
                        Filed March 27, 1939          5 Sheets—Sheet 1
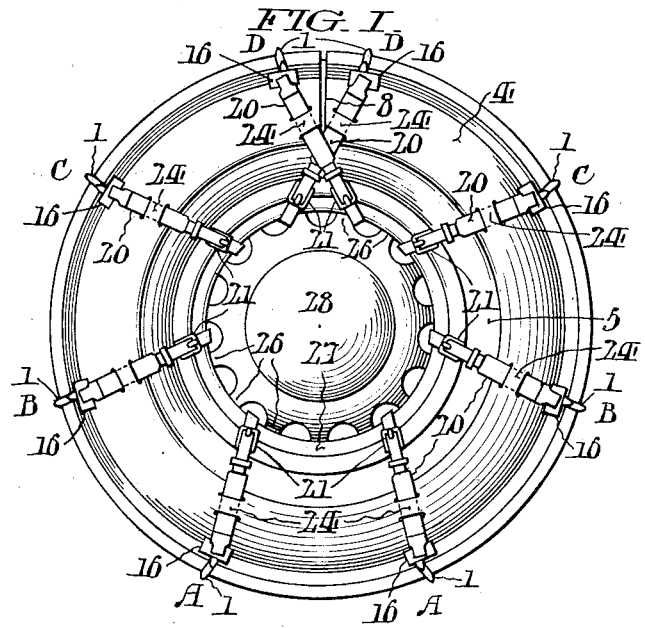
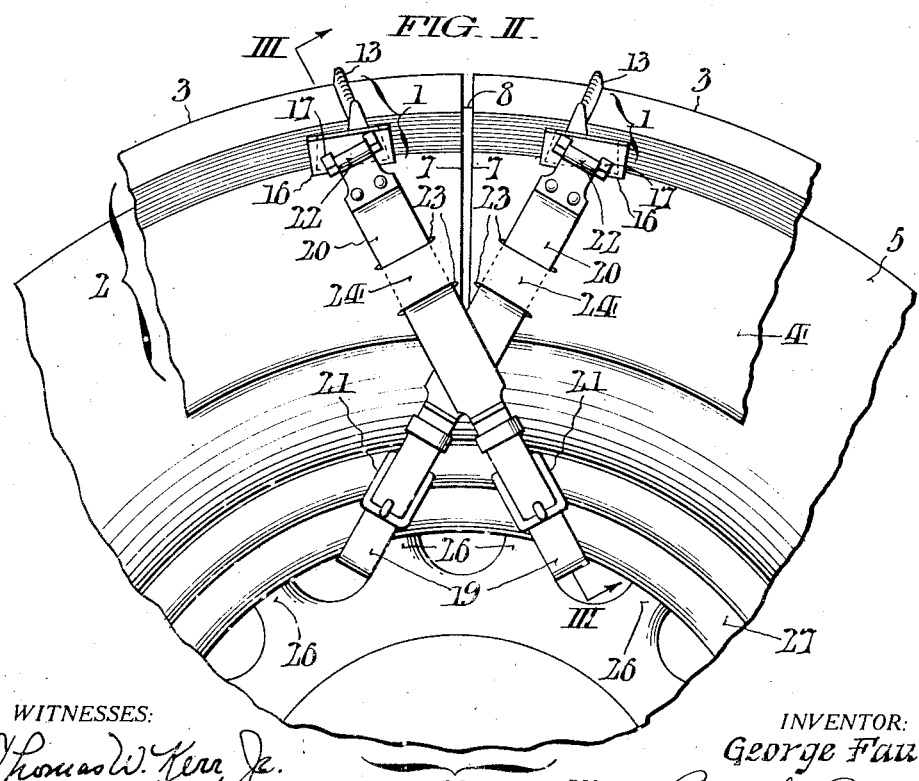
WITNESSES:                                            INVENTOR:
                                                      George Faulds
                                              BY
                                                      ATTORNEYS.

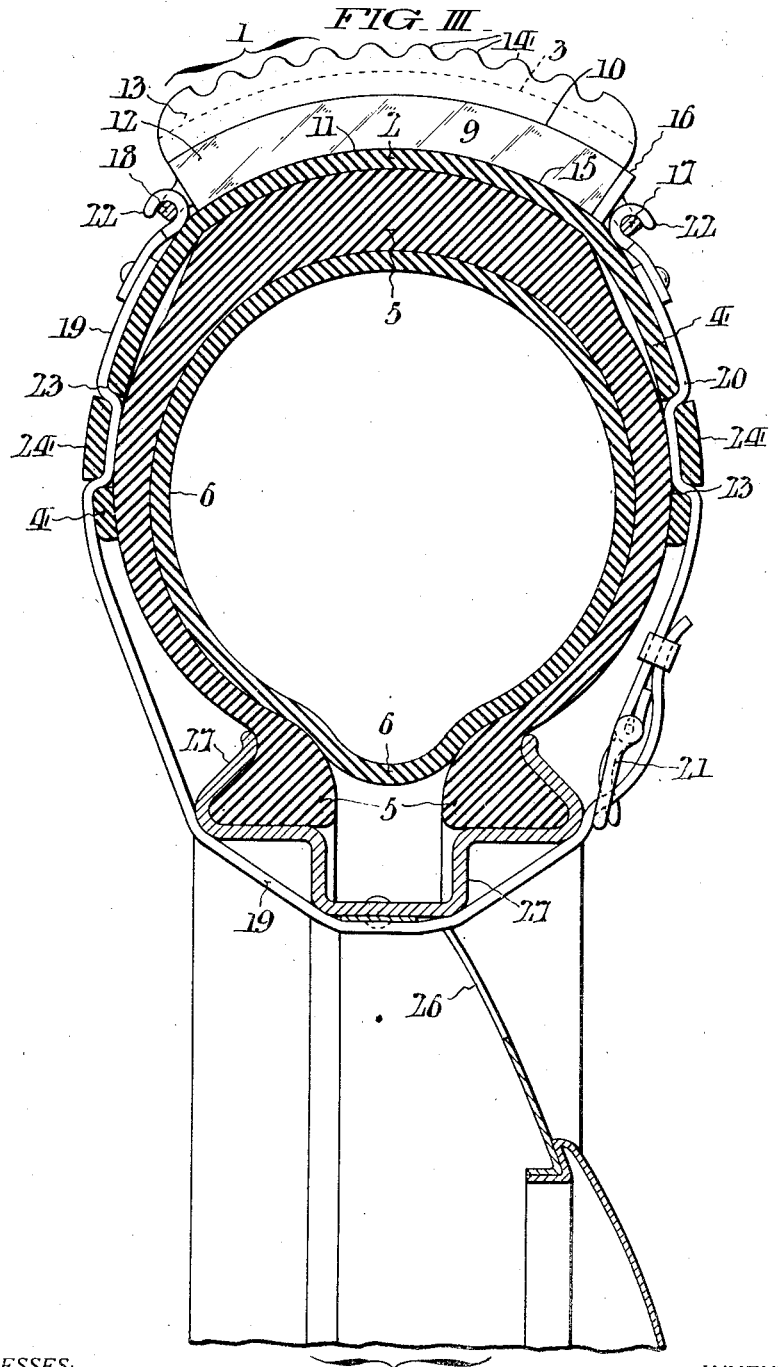

Nov. 25, 1941.  G. FAULDS  2,263,724
ANTISKID TIRE
Filed March 27, 1939 5 Sheets-Sheet 3
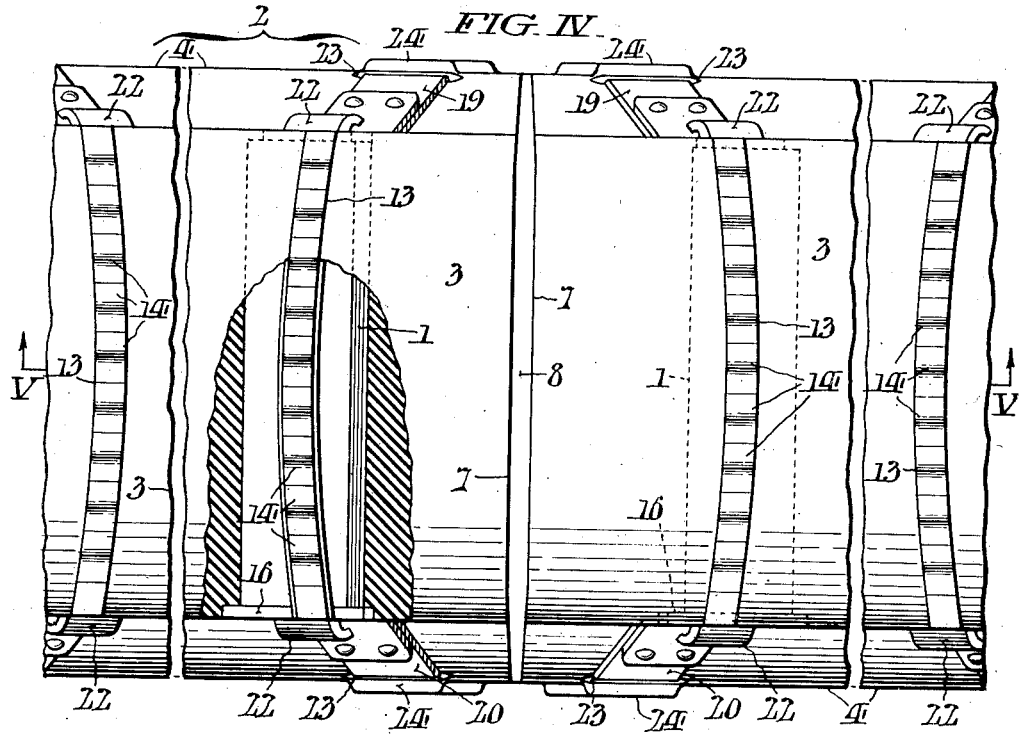
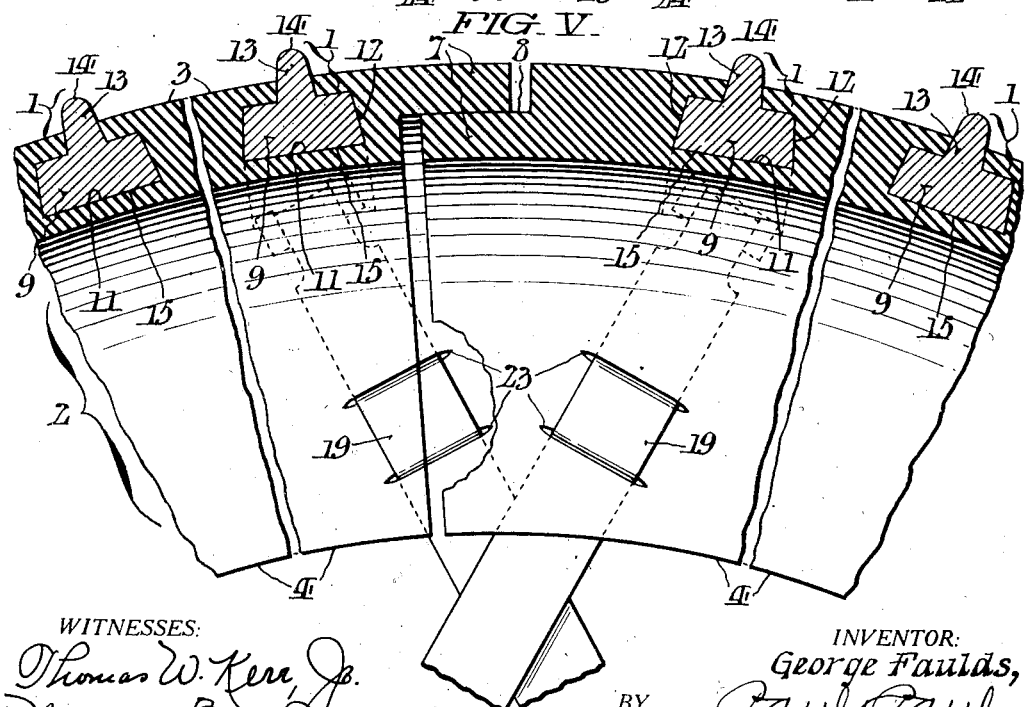
WITNESSES:
Thomas W. Kerr, Jr.
William Bell, Jr.
INVENTOR:
George Faulds,
BY Paul & Paul
ATTORNEYS.

Nov. 25, 1941.                G. FAULDS                 2,263,724
                             ANTISKID TIRE
                        Filed March 27, 1939          5 Sheets-Sheet 4
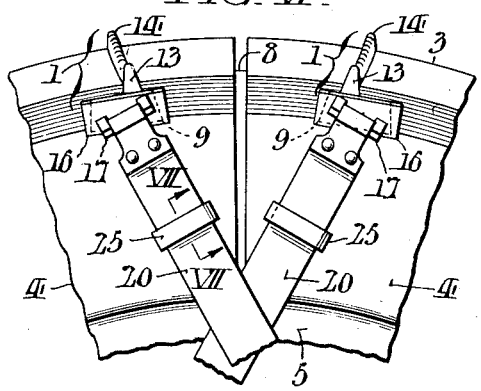
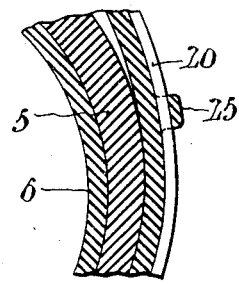
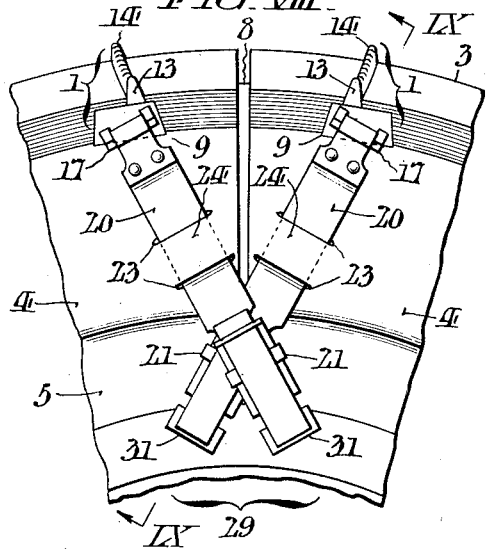
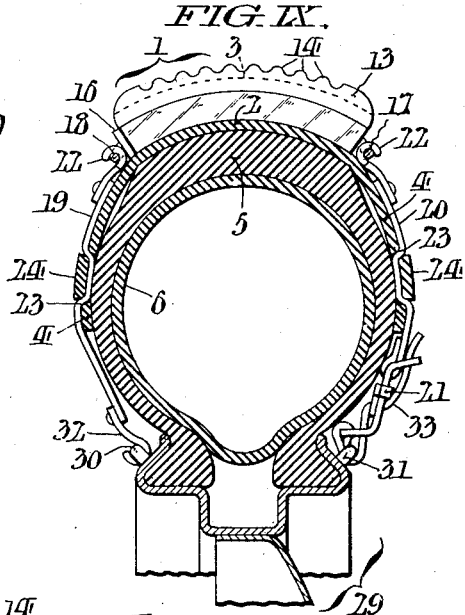
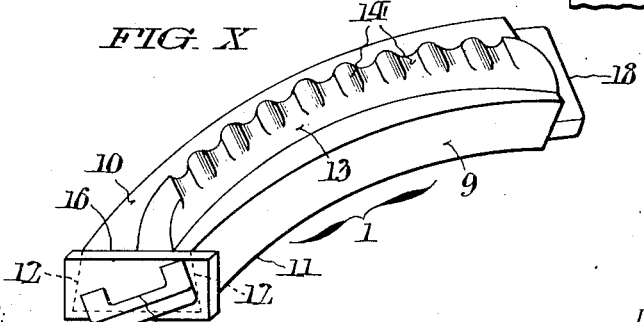
INVENTOR:
George Faulds,
BY
ATTORNEYS.

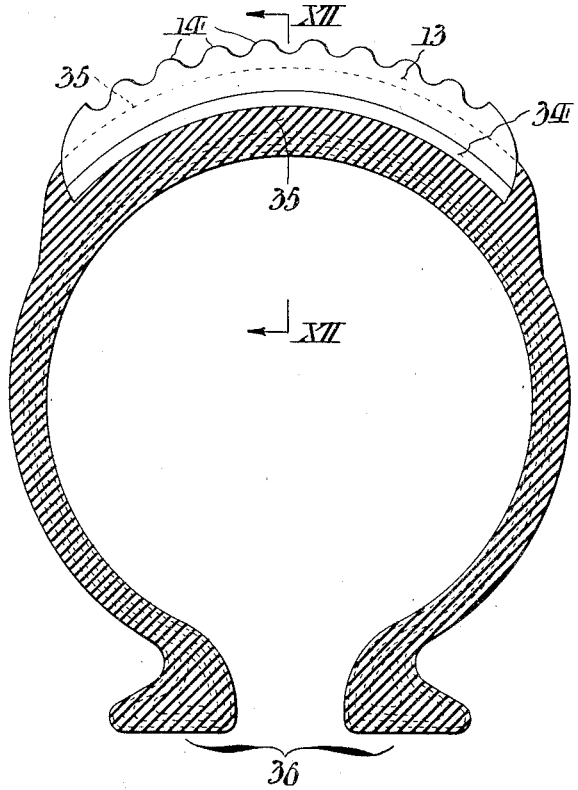
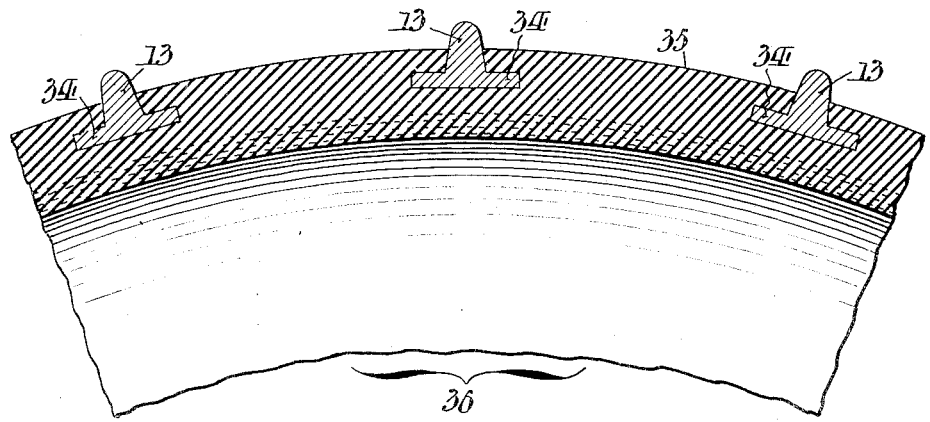

Patented Nov. 25, 1941

2,263,724

UNITED STATES PATENT OFFICE 2,263,724

ANTISKID TIRE

George Faulds, Philadelphia, Pa.

Application March 27, 1939, Serial No. 264,369

4 Claims. (Cl. 152—174)

This invention relates to vehicle tires, and has more particular reference to anti-skid means for application to, or incorporation in, the treads of such tires.

The primary object of the present invention is to provide a novel tread forming means whereby the tractive property is enhanced, and any tendency to skid is prevented when traveling over wet, ice, sleet or snow-covered, highways, streets and the like.

Another object is to provide a novel type of protector or cover that is easy to apply to standard types of vehicle wheels and tires and which, when secured thereto, presents a tread for wearing contact with the surface over which the vehicle is passing, that is substantially immune against "skidding" no matter how treacherous such surface may be.

The nature and characteristics of this invention will be best understood by reference to the accompanying sheets of drawings illustrative of preferred embodiments thereof, and which will now be described; it being premised that various changes may be made in the structural details and arrangement of the constituent parts, without departing from the spirit and scope of said invention as more particularly expressed in the concluding claims.

In the drawings:

Fig. I is a side elevation of a standard type of automobile wheel having one embodiment of the present invention applied thereto.

Fig. II is an enlarged scale fragmentary view showing the manner in which a juncture is made in accordance with the form of the preceding illustration.

Fig. III is a further enlarged scale cross-section, taken approximately on the plane III—III in Fig. II.

Fig. IV is a broken plan view of the outer surface of the tire and cover shown in Fig. I, with a portion in section to better illustrate otherwise hidden structure.

Fig. V is a longitudinal-section through the plane V—V of Fig. IV, with the tire removed.

Fig. VI is a fragmentary elevation of a slightly modified form of the invention.

Fig. VII is a fragmentary section on the plane VII—VII of Fig. VI, but drawn to an increased scale.

Fig. VIII is a part side elevation illustrating the adaptation of this invention to a solid disk wheel.

Fig. IX is a cross-section on the plane IX—IX of Fig. VIII.

Fig. X is a perspective view of one of the antiskid units hereinafter fully described.

Fig. XI is a cross-section of a multi-ply tire having the fundamental feature of this invention embodied therein; and, Fig. XII is a longitudinal section on the plane XII—XII in the preceding figure.

The anti-skid means constituting the essential feature of this invention is comprehensively designated, in Figs. I to X, inclusive, by the reference character 1, and in said figures, it is illustrated as forming part of a transversely-split rubber cover 2. This cover 2 is suitably formed and shaped to provide a substantial tread 3 having flanking portions 4 that jointly fit well over the outer-half of the tire 5 and enclosed air tube 6, with the confronting ends 7 reduced and interlapped at 8 to accommodate expansion and contraction, as best understood from Figs. IV and V.

The anti-skid means or unit 1, as best shown in Figs. III—V, and X, more particularly, embodies a substantial base 9 preferably of quadrilateral cross-section, circumferentially of the cover tread 3, and of arcual section longitudinally or transverse to said tread. In other words, the base 9 embodies outer and inner concentrically-curved faces 10, 11, respectively, with outwardly-inclined sides 12. Integral with the outer portion of each such base 9 there is formed an arcual rib 13 of predetermined curvature, said rib being of predetermined dimensions to extend transversely across the cover tread 3, as well as project outwardly thereof. It is also to be noted the projecting portion of the arcual rib 13 is corrugated at 14, or otherwise shaped to define circumferentially-directed anti-skid projections for road grippage, as later on further amplified. The units 1, as described, are individually slid or forced into somewhat inverted T-section or corresponding under-cut grooves 15, circumferentially spaced around the cover tread 3. At one end, each unit 1 is provided with a stop flange 16 having an outwardly-directed obliquely-disposed attaching-eye 17, as well as a corresponding but reversely-inclined similar eye 18 at the remote end of said unit.

Suitable means such as straps 19, 20, provided with buckles 21, serve for the purpose of firmly retaining the units 1 in position with relation to the cover 2, said straps having secured to their free ends, rigid hooks 22 adapted to loop outwardly in the respective attaching-eyes 17, 18 above referred to, and in an obvious manner. In order to prevent circumferential "creeping" of the cover 2 relative to the tire 5 the former is, for example, provided with tangentially-directed spaced slots 23 in the flanking portions 4, through which the straps 19, 20 are passed, whereby the intervening material forms similarly-disposed retainer loops 24, as shown in Figs. I-V, inclusive. Or, as illustrated in Figs. VI and VII, tangentially-directed staple-like loops 25 may be formed integral with the cover flanking portions 4 and the straps 19, 20 be passed therethrough in a clearly apparent manner. Preferably, and to additionally prevent circumferential creepage or displacement of the cover 2, at the adjoining ends 7, the straps 19, 20 are crossed so as to engage upon opposite sides of adjoining wheel spokes 26; whereas the intervening straps 19, 20 tangentially embrace the rim 27 of the wheel 28 and tire 5 between other spokes 26. It is to be particularly noted that the respective anti-skid units 1 are disposed transversely in respect to the wheel tire 5 in alternately-reversed relation, so that any two adjacent arcual ribs 13 are opposingly directed, as clearly appreciable from Fig. IV. This disposition of the arcual ribs 13 ensures packing of snow, sleet and soft earth therebetween, whereby the tractive grippage of vehicle wheels, equipped with this invention, is greatly increased, and wheel "racing" prevented.

Figs. VIII and IX illustrate the adaptation of this invention to a solid disk wheel 29, and in view of the preceding description equally applying to this embodiment, only the differing features will be explained in order to obviate unnecessary repetitive matter. In this form of the invention, attaching-eyes 30, 31 are either rigidly formed or attached to the wheel rim 27; while one of the straps 19, for instance, is provided with an additional hook 32 for engaging the eye 30; whereas the other strap 20, for example, is made in two parts or with an addition 33 which is threaded through the other eye 31, said parts 20, 33 being attached together by a buckle 21, as hereinbefore set forth.

Referring again to the straps 19, 20 and the manner of clamping same to the wheels, it will be readily understood from Fig. I that in applying the cover 2 to a wheel 28 or 29, and first tightening up the straps 19, 20, at A—A, Fig. I, or remote from the adjoining ends 7, followed by similar action at B—B, and then at C—C, said cover will be circumferentially drawn evenly and tightly around the tire 5, in contradistinction to the formation of inequalities or undulations therein if the straps 19, 20 were disposed radially of the wheels 28, 29. This feature is highly important as when the crossed straps 19, 20 at D—D in Fig. I are finally tightened-up the entire cover 2 is evenly bound to the tire 5 in a manner positively preventative of any relative movement or "creeping."

In the modified form of the invention shown by Figs. XI and XII, the anti-skid units 1 are made substantially as before described, with the exception of not having end attaching eyes 17, 18; also, that the arcual ribs 13 are formed with longitudinal or flanking flanges 34 in place of the bases 9, and said units are embedded in the tread 35 during manufacture of the tire 36.

From the foregoing, the merits and advantages of the invention will be fully apparent without further elaboration herein, while it is to be remarked the anti-skid units 13 for winter weather service are preferably made of durable metal, and that they may be replaced by hard rubber corresponding ones for use in wet weather.

Having thus described my invention, I claim:

1. The combination with a vehicle tire of a protector comprising a transversely-split flexible cover, rigid inserts circumferentially-spaced and transversely-disposed around the tread portion of the cover, each insert embodying a curvilinearly-contoured substantial base with an arcual anti-skid rib bowed circumferentially of the protector, complemental-sectioned grooves transversely across the cover tread portion slidably receiving the rigid inserts with capacity for ready removal, and means for securing the protector to the vehicle tire.

2. The combination with a vehicle tire of a protector comprising a transversely-split flexible cover, rigid inserts circumferentially-spaced and transversely-disposed around the tread portion of the cover, each insert embodying a curvilinearly-contoured substantial base and an arcual rib bowed circumferentially of the protector, said rib having the outer edge suitably shaped to define circumferentially-disposed anti-skid projections, complemental-section transverse grooves through the cover tread slidably receiving the inserts with capacity for removal and the arcual ribs projecting outwardly thereof, and means for securing the cover around the vehicle tire.

3. The combination with a vehicle tire of a protector comprising a transversely-split flexible cover, rigid inserts circumferentially-spaced and transversely-disposed around the tread portion of the cover, each insert embodying a curvilinearly-contoured substantial base and an arcual rib bowed circumferentially of the protector, said rib having the outer edge suitably shaped to define circumferentially-disposed anti-skid projections, said inserts being disposed in alternately-reversed relation, complemental-section transverse grooves through the cover tread slidably receiving the inserts with capacity for removal and the arcual ribs projecting outwardly beyond the cover tread, angularly-directed eyes at the ends of the respective inserts for tangential coaction with the cover tread flanking portions, and means engageable with said eyes to clamp the cover around the vehicle tire.

4. As an article of manufacture, an anti-skid insert, for wheel tire protectors of the type described, comprising a substantial base portion of quadrilateral cross-section, an arcual rib projecting from said base with radially related anti-skid corrugate projections along its outer edge, a stop flange at one end of the insert with an obliquely disposed attaching-eye projecting outward thereof, and a reversely-inclined attaching-eye at the other end of said insert.

GEORGE FAULDS.